Nov. 4, 1969 R. E. TURNAGE, JR., ET AL 3,476,974
DIGITAL CONTROLLED ELLIPTICAL DISPLAY
Filed Jan. 22, 1968 2 Sheets-Sheet 1

INVENTORS
RODGER ELMO TURNAGE JR
JERALD T. STEBBINS
LAWRENCE R. CRUMP
BY Anderson, Luedeka, Fitch, Even & Tabin
ATTORNEYS INVENTORS
RODGER ELMO TURNAGE JR.
JERALD T. STEBBINS
LAWRENCE R. CRUMP
BY Anderson, Luedeka, Fitch, Even & Tabin
ATTORNEYS

United States Patent Office 3,476,974
Patented Nov. 4, 1969

3,476,974

DIGITAL CONTROLLED ELLIPTICAL DISPLAY

Rodger Elmo Turnage, Jr., Jerald T. Stebbins, and Lawrence R. Crump, San Diego, Calif., assignors to Stromberg Datagraphix, Inc., a corporation of Delaware Filed Jan. 22, 1968, Ser. No. 699,499
Int. Cl. H01j 29/70
U.S. Cl. 315—23 22 Claims

ABSTRACT OF THE DISCLOSURE

An electronic apparatus is provided for producing an ellipse upon a cathode ray tube screen or other display device in response to the command of digital signals from a computer or other program source. The apparatus includes means for generating quadrature phase, sinusoidal wave forms and means for modifying such wave forms in phase or amplitude in response to digital signals, to thereby obtain wave forms which define an ellipse whose size, eccentricity and and rotation are defined by the digital signals.

This invention relates generally to ellipse generating apparatus and, more particularly, to an apparatus for forming an ellipse on a cathode ray tube screen or other display device in response to digital signals from a computer or other program source.

Prior art ellipse generators have generated orthogonal functions which define an ellipse in response to a digital signal, but such generators have not been satisfactory. Such ellipse generators, have required long time periods to start and stop. When the ellipse was part of a display, the long start period produced a flicker in the display. The long stop period resulted in the ellipse functions being regenerated 5 or 6 times for each start signal and distortions in the generated functions caused imperfect tracing on cycles after the first.

An object of the present invention is the provision of an improved digital controlled ellipse generator.

A further object is the provision of a digitally programmed ellipse generator that immediately generates an output signal in response to a start pulse and immediately stops after one cycle is generated.

These and other objects of the invention are more particularly set forth in the following detailed description and in the accompanying drawings of which:

Briefly, in accordance with the present invention, an apparatus is provided for generating orthogonal functions, which define an ellipse, under control of digital instructions that identify the essential parameters of the ellipse. The ellipse generating apparatus includes a means for generating two sinusoidal waves in quadrature phase, in response to a start signal. Means are provided for modifying these waves in phase or amplitude in accordnace with digital control signals representing the eccentricity, the axis rotation, and the axis length desired in the ellipse.

In accordance with basic analytical geometry, the parametric equations of a circle on an X–Y coordinate plane are:

$$x=R\cos(\omega t),\text{ and}$$
$$y=R\sin(\omega t)$$

where R is the radius of the circle and the parameter $\omega$ is the rate of angular rotation of a point which draws the circle.

With the above equations, the starting point P is on the positive X-axis and the rotation is counter-clockwise. The parametric equations of a circle which is located so that the starting point P is no longer on the X-axis but on a radius at angle $\alpha$ to that axis are:

$$y=R\cos(\omega t+\alpha),\text{ and}$$
$$y=R\sin(\omega t+\alpha)$$

By basic trigonometry these equations can be converted to:

$$X=R\cos(\omega t)\cos\alpha-R\sin(\omega t)\sin\alpha$$

and $$Y=R\cos(\omega t)\sin\alpha+R\sin(\omega t)\cos\alpha$$

These parametric equations define a circle which is one form of an ellipse, i.e., the eccentricity $e$ of the ellipse is equal to zero. The eccentricity $e$ is related to the length of the semi-major axis R of the ellipse and to the length of the semi-minor axis $r$ by the equation:

$$e=\frac{\sqrt{R^2-r^2}}{R}$$

To introduce eccentricity into the equations, a semi-minor axis $r$ is substituted for the semi-major axis R in the second term of each equation and the equations become:

$$x=R\cos(\omega t)\cos\alpha-r\sin(\omega t)\sin\alpha$$

and $$y=R\cos(\omega t)\sin\alpha+r\sin(\omega t)\cos\alpha$$

Figure 1:
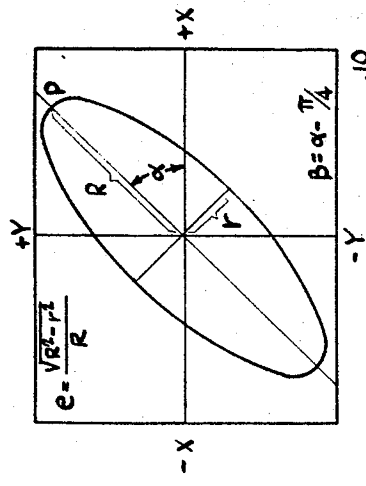
FIGURE 1 is a coordinate display of an ellipse.

By feeding waveforms representing the above equations to the deflection controls of a cathode ray tube or other display device an ellipse such as shown in FIGURE 1 will be displayed on the screen of the cathode ray tube.

Figure 2:
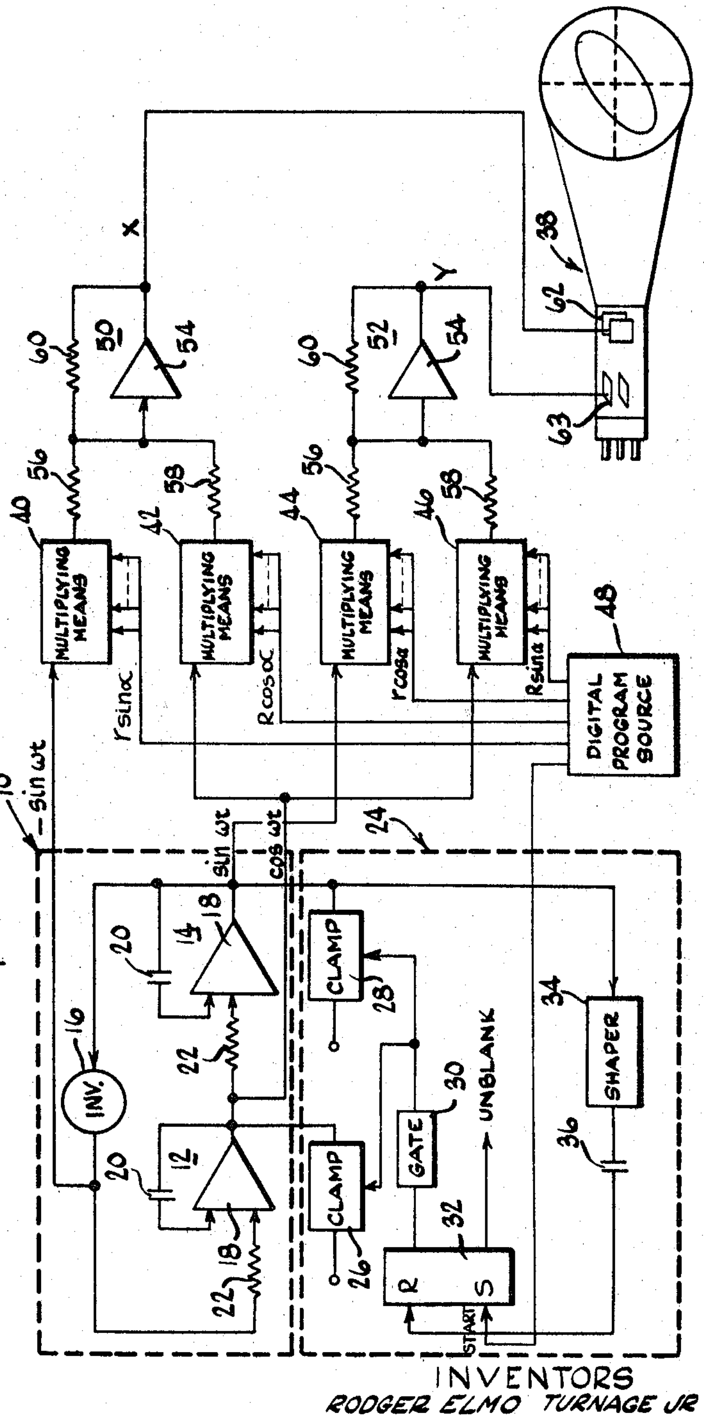
FIGURE 2 is a block diagram of one embodiment of the ellipse generator in accordance with this invention.

The wave forms representing a desired ellipse are generated by the embodiment shown in FIGURE 2 by generating quadrature phase sinusoidal waveforms, changing the amplitude of these waveforms by multiplying the same by predetermined quantities whose digitally selected amplitudes are functions of the desired lengths of the semi-major axis R and the semi-minor axis $r$ and of the angle $\alpha$ corresponding to the desired rotation of the semi-major axis, and then adding together the resulting waveforms in proper combination to provide the desired $x$ and $y$ signals. More specifically, in the embodiment illustrated in FIGURE 2, the quadrature phase sinusoidal waveforms are generated by a sinusoidal generator 10. The illustrated sinusoidal generator 10 includes two integrators 12 and 14 and an inverter 16 coupled in a loop configuration. Each integrator 12 and 14 includes an operational amplifier 18, having a high numerical gain preferably in the range of 500–2000, with a capacitor 20 as a feed back impedance and a resistor 22 as an input impedance. Each integrator 12 and 14 produces a phase shift between its input and output of 90 degrees and thus, with the 180 degrees phase shift provided by the inverter 16, a loop phase shift of 360 degrees is obtained. The integrators 12 and 14 provide a loop gain of 1 and hence the loop oscillates at a frequency $$\omega=\frac{1}{RC}$$

radians per second. By selecting proper points on the loop, quadrature phase sinusoidal outputs may be obtained.

For applications where great accuracy is not needed, integrators of other types may be used provided that a loop phase shift of 360 degrees and a loop gain of one is obtained. For example, the integrator may use an amplifier having a voltage gain lower than a commercial operational amplifier but appreciably greater than unity. Passive low pass filter circuits connected in cascade with one or more amplifiers so that the complete loop has unity gain at the desired frequency $\omega$ may also be used.

In the illustrated embodiment, the sinusoidal generator 10 is disabled until an ellipse is desired and is disabled after a single cycle by a clamping circuit 24. The use of the clamping circuit permits virtually instantaneous start of the sinusoidal generator. The clamping circuit 24 includes a pair of clamps 26 and 28, one of which clamps the output of the first integrator 12 to a voltage representing full scale or unity amplitude of the sinusoidal generator 10, and the other of which clamps the second integrator 14 to a minimum or zero voltage. Since the outputs of the integrators 12 and 14 are in quadrature phase, this ensures that both outputs are at a zero time reference point at the start of a cycle. Of course, any other convenient position on the cycle could be employed as the starting point. The output of the first integrator 12 starts at unity amplitude and therefore is a cosine wave. The output of the second integrator 14 starts at zero amplitude and therefore is a sine wave.

To start the generation of the ellipse, the clamps 26 and 28 are disabled by a gate 30 which is common to the two clamps 26 and 28 and is activated by the reset output of a flip-flop circuit 32. The flip-flop circuit 32 is switched by a start signal from a suitable source such as a digital program source 48, which is applied to the set input of the flip-flop circuit 32. The cycle of the sinusoidal generator 10 is stopped after one complete cycle by the flip-flop circuit 32 being reset, thereby reactivating the clamps 26 and 28. The reset pulse for the flip-flop circuit 32 is provided by connecting the output of the second integrator 14, which is the sine wave, through a shaper circuit 34 which provides a rectangular wave at its output corresponding to the negative cycle of the sine wave. The rectangular wave is then differentiated, partly by a capacitor 36, to provide a sharp pulse at the training edge of the rectangular wave which corresponds to the end of the cycle. This differentiated pulse is coupled to the reset input of the flip-flop circut 32, thereby resetting the flip-flop circuit 32, restoring the clamped conditions, and preventing further oscillation of the sinusoidal generator 10.

The set output of the flip-flop circuit 32 is coupled to a display device 38 which, in the illustrated embodiment, is a cathode ray tube in such a way as to unblank the display device and thereby permit the ellipse to be drawn on the display screen.

In FIGURE 2, the sinusoidal outputs of the sinusoidal generator 10 are supplied to the respective analog or reference inputs of four multiplying means 40, 42, 44 and 46 wherein the sinusoidal waveforms are multiplied by predetermined sine and cosine functions designated by binary signals supplied by a digital program source 48. Each multplying means includes a digital-to-analog converter which multiplies together two inputs supplied thereto. The digital-to-analog converters may be of any conventional type, such as the solid state device shown in U.S. Patent No. 2,718,634, the vacuum tube device shown in Patent No. 2,827,233, the device known in the analog computer art as the MIT multiplier, the devices used in the digital voltmeter industry, etc. Such converters provide a signal at an analog output terminal which is proportional to the binary weighted sum of the digital signals applied to a plurality of digital input terminals, if the reference signal is constant, and proportional to the reference signal if the digital signals are constant. The output signal is thus proportional to the product of the analog or reference signal which is in this case a sinusoidal signal, and the binary weighted sum of the digital inputs.

The illustrated digital program source 48 may be of any conventional type which supplies binary signals of a suitable accuracy, e.g. 9–12 bits, for designating sine and cosine functions of the axis rotation angle $\alpha$ and the amplitudes R and $r$ at the binary inputs to the digital-to-analog converter.

In certain applications, the multiplying means may be an electronic multiplier adapted to receive two analog inputs, such as the quarter-square-multiplier. With such a multiplier, the binary signals from the digital program source 48 are first converted to analog signals in a separate converter having a fixed reference. In other applications, the digital-to-analog converters may be adapted to receive signals coded according to some scheme other than binary coding, e.g., binary coded decimal, biquinary, excess three, etc.

In the embodiment illustrated in FIGURE 2, a cosine ($\omega t$) waveform, a (—) sine ($\omega t$) waveform, and a sine ($\omega t$) waveform are selected at suitable points on the sinusoidal generator 10 and are supplied to the reference input terminals of the digital-to-analog converters 40, 42, 44 and 46 (hereinafter referred to as the first, second, third, and fourth, respectively). The digital inputs are supplied with the proper digital signals to provide outputs which, when added together, provide the parametric equations of the desired ellipse. From the previously discussed parametric equations it can be seen that by multiplying the cos ($\omega t$) waveform by an R cos $\alpha$ digital signal and by multiplying the (—) sin $\omega t$ wave form by $r$ sin $\alpha$ digital signal and by then adding the two products together, the parametric equation for the X waveform is obtained. Thus, as shown in FIGURE 2, the (—) sin ($\omega t$) waveform and the cos ($\omega t$) waveform from the sinusoidal generator 10 are supplied respectively to the reference input terminals of the first and second multiplying means 40 and 42. An $r$ sin $\alpha$ digital signal and an $R$ cos $\alpha$ digital signal are respectively supplied to the digital inputs of the first and second multiplying means 40 and 42. The outputs of the first and second multiplying means 40 and 42 are added together in an adder circuit 50, described hereinafter.

Likewise, by multiplying the cos ($\omega t$) waveform by an $R$ sin $\alpha$ digital signal and by multiplying the sin ($\omega t$) waveform by an $r$ cos $\alpha$ digital signal and by then adding the products together, the parametric equation for the Y waveform is obtained. More particularly, the sin ($\omega t$) waveform and the cos ($\omega t$) waveform are respectively supplied to the reference inputs of the third and fourth multiplying means 44 and 46. An $r$ cos $\alpha$ digital signal and an $R$ sin $\alpha$ digital signal are respectively supplied to the digital inputs of the third and fourth multiplying means 44 and 46. The outputs of the third and fourth multiplying means 44 and 46 are added together in an adder circuit 52.

In the illustrated embodiment, the adder circuits 50 and 52 include an operational amplifier 54 having two input resistors 56 and 58 and one feedback resistor 60, all of equal value, joined at a single input terminal of the operational amplifier 54. Operational amplifier having numerical voltage gains in the range of 500 to 2000 are preferred because of the resulting accuracy. However, in certain application summing circuits of other types such as, for example, feedback circuits in which the input and output signals are currents rather than voltages, may be used. Additionally, the signals may be converted into magnetic flux or light flux and the fluxes added by linear superposition to provide a sum or total flux which is then reconverted into an electrical current or voltage signal.

In the illustrated embodiment, the X and Y waveforms at the outputs of the adder circuit are coupled to the X and Y deflection electrodes 62 and 63 respectively, of the cathode ray tube 38. The path of the electron beam on the screen of the cathode ray tube is thereby controlled by the X and Y signals and an ellipse is generated in accordance with the X and Y waveforms. Other display devices in which the display is controlled by two quadrature waveforms, may be employed.

Figures 3, 4:
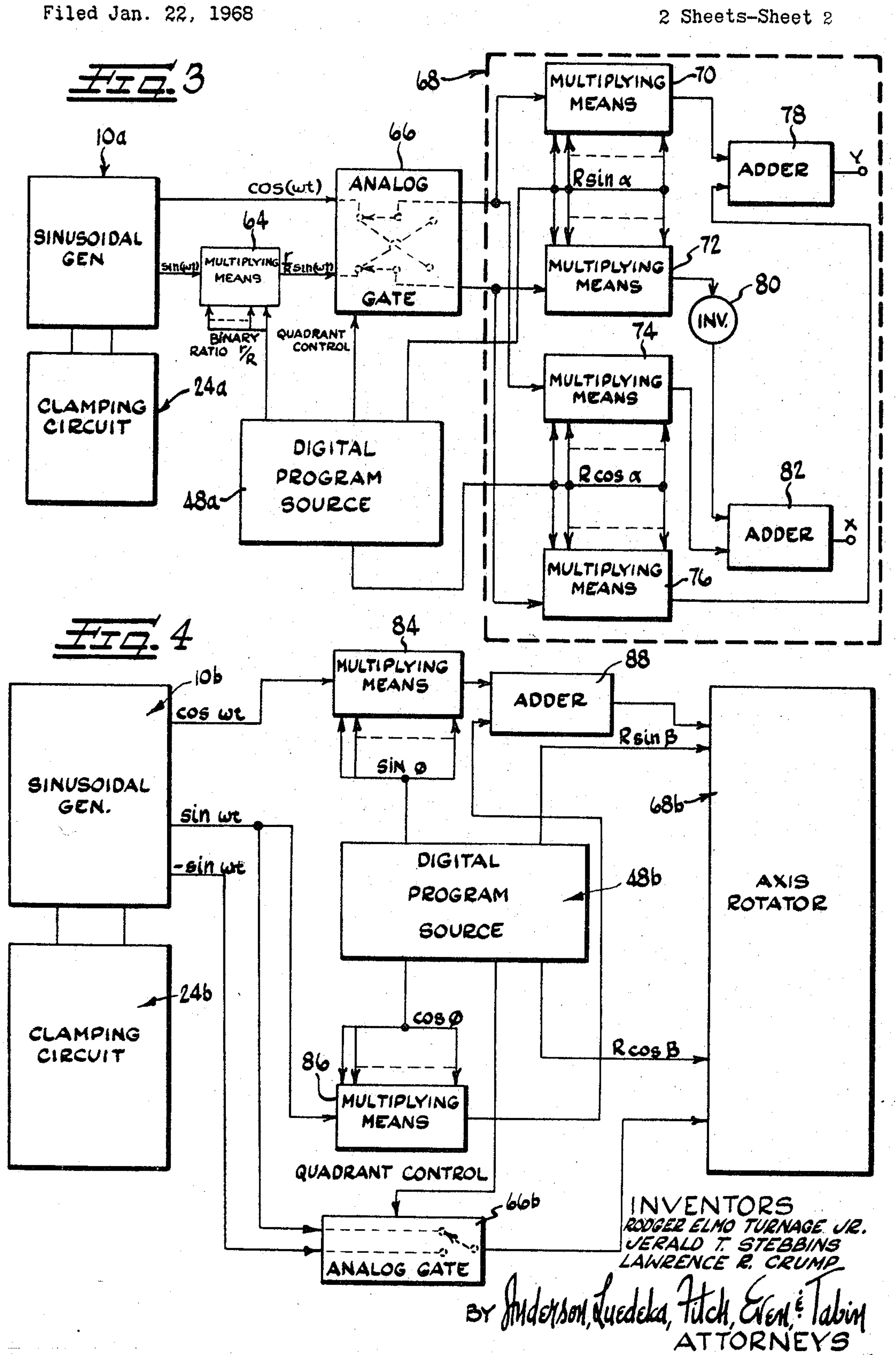
FIGURES 3 and 4 are block diagrams of other embodiments of the ellipse generator.

FIGURE 3 shows an embodiment of the ellipse generator in which the sinusoidal waves are converted to the parametric equations of an ellipse by apparatus which requires an additional digital to analog converter as compared to the apparatus shown in FIGURE 2. In the embodiment shown in FIGURE 3, wherein parts similar to those shown in FIGURE 2 are indicated by the same reference numeral with the subscript "*a*," one of the sinusoidal waves generated by the sinusoidal generator 10*a* is attenuated in accordance with the eccentricity of the desired ellipse, and the attenuated waveform and the non-attenuated sinusoidal waveform are coupled to a means for providing the desired rotation of the axis of the ellipse. The resulting parametric equations are the same as the parametric equations which are produced by the embodiment shown in FIGURE 2.

More particularly, a sinusoidal waveform produced by the sinusoidal generator 10*a*, which in the illustrated embodiment is the sine $(\omega t)$ waveform, is coupled to a means 64 for multiplying the waveform in accordance with the eccentricity ratio $r/R$ provided by the digital program source. The multiplying means 64 in the illustrated embodiment may be similar to that previously discussed in connection with the embodiment shown in FIGURE 2. The eccentricity ratio $r/R$ is provided by the digital program source as a binary number with the accuracy required by the application, for example 9, 10, or 12 bit accuracy. The eccentricity is determined by the ratio $r/R$ since the eccentricity $e$ is equal to $$\sqrt{1-(r/R)^2}$$

The attenuated sinusoidal wave $r/R$ sine $(\omega t)$ and a non-attenuated sinusoidal wave cosine $(\omega t)$ supplied by the sinusoidal generator 10*a*, are coupled through an analog gate 66 to an axis rotator means 68. The analog gate serves to control the quadrant of the major axis of the generated ellipse by providing a means whereby the waves applied to the inputs of the axis rotator means 68 can be reversed. The analog gate 66 is illustrated as a double throw switch; however, a relay or a semiconductor switch may be used. The analog gate 66 can be eliminated if the binary signals applied to the axis rotator means 68 can be selected as either positive or negative signals.

The illustrated axis rotator means 68 includes four multiplying means 70, 72, 74 and 76, which may be similar to that previously discussed in connection with FIGURE 2. The multiplying means serve to multiply the input signals by suitable binary signals as provided by the digital program source 48*a* and the products are added in a predetermined manner so as to provide the parametric equations of an ellipse with its axis rotated by the desired angle $\alpha$. In basic analytic geometry, the formulas of rotation, i.e., the formulas for transforming a given equation with the variables $x'$ and $y'$ into a new equation with the variables $x$ and $y$ in which the new coordinate axes are drawn through the old origin but inclined at an angle $\alpha$ to the old axes, are:

$$x=x' \cos \alpha - y' \sin \alpha$$

and $$y=y' \cos \alpha + x' \sin \alpha$$

It can be seen that if non-attenuated wave cosine $(\omega \cdot t)$ is substituted for $x'$ and the attenuated waveform $$\frac{r}{R} \text{sine}(\omega t)$$

is substituted for $y'$, and all terms are multiplied by R to establish the scale or size of the ellipse the parametric equation for the desired ellipse is obtained.

As shown, the non-attenuated wave form cosine $(\omega t)$ is connected to the analog inputs of the first and the third multiplying means 70 and 74 and an R sine $\alpha$ digital signal and an R cosine $\alpha$ digital signal supplied by the digital program source, are respectively coupled to the digital inputs of the first and third multiplying means 70 and 74. The attenuated waveform $$\frac{r}{R} \sin (\omega t)$$

is coupled to the analog input of the second and fourth multiplying means 72 and 76, and the R sine $\alpha$ and the R cosine $\alpha$ digital signals are respectively coupled to the digital input of the second and fourth multiplying means. The outputs of the first and fourth multiplying means 70 and 76 are added in an adder circuit 78, which may be similar to that described in connection with FIGURE 2. The output of the second multiplying means 72 is inverted by an inverter circuit 80 and is then added to the output of the third multiplying means 74 in a second adder circuit 82. The inverter circuit 80 may for example, be an operational amplifier having a voltage gain of 500 to 2000 and having input and feedback resistors of equal value. The resulting Y and X signals are the parametric equations of the desired ellipse which signals are applied to the deflection controls of the cathode ray tube.

In the embodiment shown in FIGURE 4, wherein parts similar to those shown in FIGURE 2 are indicated with the same reference numeral with the subscript "*b*," the eccentricity of the ellipse is obtained by shifting the phase of one of the quadrature waveforms generated by the sinusoidal generator 10*b* in accordance with the digital information supplied by the digital program source 48*b*. More particularly, an ellipse with its major axis inclined at an angle $\pi/4$ radians is generated by employment of the following two sinusoidal waves at the corresponding coordinates of the orthogonal display:

$$X=A \sin (\omega t+\varphi)=A \sin \varphi \cos (\omega t)+A \cos \varphi \sin (\omega t)$$

and $$Y=A \sin (\omega t)$$

The above equations show that the X coordinates of the ellipse can be generated by multiplying phase quadrature sinusoidal waveforms by sine $\varphi$ and cosine $\varphi$ digital quantities and then adding together the resulting products. The phase shift angle $\varphi$ determines the eccentricity of the ellipse. The relationship of the phase shift angle $\varphi$ to the eccentricity $e$ is defined with reference to FIGURE 1. It can be shown by trigonometry that $R=\sqrt{2}\, A \cos (\varphi/2)$ and $r=\sqrt{2}\, A \sin (\omega/2)$, if A is a scaling constant. Substituting these values in the eccentricity equation, the following is obtained:

$$e=\frac{\sqrt{\cos^2\left(\frac{\varphi}{2}\right)-\sin^2\left(\frac{\varphi}{2}\right)}}{\cos\left(\frac{\varphi}{2}\right)}$$

The above equation defines the mathematical relationship between eccentricity $e$ and the phase shift angle $\varphi$. Given any desired eccentricity the digital program source 48*b* can readily compute the required digital quantities sine $\varphi$ and cosine $\varphi$.

In the embodiment illustrated in FIGURE 4, the cosine $(\omega t)$ and sine $(\omega t)$ waveforms generated by the sinusoidal generator 10*b* are respectively coupled to the analog inputs of two multiplying means 84 and 86. The multiplying means 84 and 86 may be similar to those previously described in connection with FIGURE 2. Digital program source 48*b* supplies binary signals of appropriate accuracy, e.g. 9 to 12 bits, for designating the sine $\varphi$ and cosine $\varphi$ functions respectively to the binary inputs of the multiplying means 84 and 86.

The outputs of the multiplying means 84 and 86 are respectively sin $\varphi$ cos $(\omega t)$ and cos $\varphi$ sin $(\omega t)$, and these signals are added together in an adder circuit 88 which may be similar to the adder circuit described above in connection with FIGURE 2.

The output of the adder circuit 88 and the output of the analog gate 66*b* define an ellipse with its major axis at an angle of $\pi/4$. The analog gate **66*b* selects either the (+) sin ($\omega t$) or the (−) sin ($\omega t$) waveform supplied by the sinusoidal generator 10*b* and therefore designates the ellipse major axis to pass through either the first and third or the second and fourth quadrants. The outputs of the adder circuit 88 and the analog gate 66*b* are applied to the axis rotator 68*b*. The axis rotator 68*b* controls the axis length R and the axis rotation $\alpha$ in accordance with two binary words, identified as R sine $\beta$ and R cosine $\beta$, which are supplied by the digital program source 48*b* to the axis rotator 68*b*. The angle $\beta$ is related to the orientation angle $\alpha$ of the ellipse (FIGURE 1) by $\beta=\alpha-\pi/4$ so that the ellipse may be rotated by $\beta$ degrees from the $\pi/4$ reference line. This results in a somewhat complex definition of the ellipse since the rotation of the major axis of the ellipse with respect to the X axis is defined as the angle $\alpha$, while the digital signals supplied to the axis rotator 68*b*** are defined as R sine $\beta$ and R cosine $\beta$. The conversion of the desired angle $\alpha$ into the angle $\beta$ is an extra step within the digital program source. This embodiment may be advantageous in some applications, however, if the angle $\beta$ is available in the digital computer as the result or the required input for some other problem and the angle $\alpha$ is not available.

It is seen therefore that the present invention has provided a digitally controllable ellipse generator system that achieves the object of the invention. Various changes and modifications can be made in the described apparatus without deviating from the sphere or scope of the present invention.

Various of the features of the invention are set forth in the following claims.

What is claimed is:

1. A digitally controlled ellipse generator comprising means for generating two fixed amplitude sinusoidal waves in quadrature phases, said generating means including a pair of integrating circuits coupled in a loop configuration, a source of synchronizing pulses, means programming the generating means to produce a single cycle in response to a synchronizing pulse, said programming means including at least one two-state clamping circuit for establishing said integrating circuits selectively in operating and quiescent states, first digitally responsive multiplying means for producing from one of said two waves a third sinusoidal wave, and a digital source for supplying binary digital signals to said multiplying means representative of the eccentricity of the ellipse, whereby said multiplying means establishes the amplitude of said third wave.

2. A digitally controlled ellipse generator for producing a wave form on a two axis graphical reproducing device comprising means for generating two fixed amplitude sinusoidal waves in quadrature phases, first digitally responsive multiplying means for producing from one of said two waves a third sinusoidal wave, a digital source for supplying digital signals to said multiplying means representative of the eccentricity of the ellipse, whereby said multiplying means establishes the amplitude of said third wave, axis rotating means responsive to said third wave and to the other of said two waves for producing two modified sinusoidal waves having the phases and amplitudes required to generate on said reproducing device an ellipse with its major axis inclined at a selected angle with respect to the axes of the reproducing device, said axis rotating means including second digitally responsive multiplying means and adding means, said digital source supplying digital signals to said second multiplying means representative of the selected angle of the major axis of the ellipse.

3. An ellipse generator as defined in claim 2 in which said second multiplying means comprises a plurality of digital-to-analog converters.

4. A digitally controlled waveform generator for producing an elliptical pattern on a two-axis graphical reproducing device comprising in combination, a means for generating two fixed amplitude sinusoidal waves in quadrature phases, digitally controlled multiplying means for producing from each of said two fixed-amplitude waves two sinusoidal waves whose amplitude is controlled in accordance with digital signals supplied to said multiplying means, a digital source coupled to said multiplying means for supplying thereto digital signals representative of selected eccentricity and selected major axis angle of the ellipse, and adding means coupled to said multiplying means for producing from said controlled amplitude waves two modified sinusoidal waves having the phases and amplitudes to generate on said reproducing device an ellipse of the selected eccentricity with its major axis inclined at the selected angle with respect to an axis of the reproducing device.

5. A waveform generator as defined in claim 4 in which the fixed-amplitude waves are of equal amplitude, the multiplying means comprises four digital-to-analog converters each having an output waveform comprising a product of one of the two equal amplitude waves and one of four digital parameters, said parameters jointly representing the selected eccentricity and angle of the ellipse, and the adding means comprises two adding circuits each being coupled to the outputs of two multiplying means.

6. A waveform generator as defined in claim 5 in which the two equal amplitude waves are defined as cosine ($\omega t$) and sine ($\omega t$) respectively, which further includes means to produce from the wave sine ($\omega t$) an inverted wave —sine ($\omega t$), in which the two axes of the reproducing device are orthogonal and are defined as the X-axis, and the Y-axis, the length of the semi-major axis of the ellipse is defined as R, the length of the semi-minor axis of the ellipse is defined as $r$, the selected angle of the major axis of the ellipse with respect to the X-axis of the reproducing device is defined as $\alpha$, the digital parameters supplied to said four digital-to-analog converters are respectively defined as $R$ cosine ($\alpha$), $R$ sine ($\alpha$), $r$ cosine ($\alpha$), and $r$ sine ($\alpha$), the wave cosine ($\omega t$) is coupled to the first two of said four digital-to-analog-converters, the wave sine ($\omega t$) is coupled to the third of said four analog-converters, the wave —sine ($\omega t$) is coupled to the fourth of said analog-to-digital converters, the four controlled amplitude waves are respectively $R$ cosine ($\alpha$) cosine ($\omega t$), $R$ sine ($\alpha$) cosine ($\omega t$), $r$ cosine $\alpha$ sine ($\omega t$), and $-r$ sine $\alpha$ sine ($\omega t$), the controlled waves $R$ cosine ($\alpha$) cosine ($\omega t$) and $-r$ sine ($\alpha$) sine ($\omega t$) are coupled to the inputs of the first of said two adding circuits, the controlled waves $R$ sine ($\alpha$) cosine ($\omega t$) and $r$ cosine ($\alpha$) sine ($\omega t$) are coupled to the inputs of the second of said two adding circuits, the first of the two modified waves is defined as $X=R$ cosine ($\alpha$) cosine ($\omega t$)$-r$ sine $\alpha$ sine ($\omega t$), the second of the two modified waves is defined as $Y=R$ sine ($\alpha$) cosine ($\omega t$)$+r$ cosine $\alpha$ sine ($\omega t$), and the two modified waves X and Y are connected to produce respectively X axis and Y axis deflection on the reproducing device.

7. A waveform generator as defined in claim 4 in which said generating means comprises a pair of integrating circuits coupled in a loop configuration, and which further includes a source of synchronizing pulses and means for programming the generating means to produce a single cycle in response to a synchronizing pulse.

8. A waveform generator as defined in claim 7 in which the digital signals are binary, and said programming means comprises at least one two-state clamping circuit for establishing said integrating circuits selectively in operating and quiescent states.

9. A digitally controlled ellipse generator for producing a waveform on a two axis graphical reproducing device comprising in combination, means for generating two sinusoidal waves in quadrature phases, digitally responsive phase shifting means for producing from said two sinusoidal waves a third sinusoidal wave with phase intermediate said quadrature phases, said phase shifting means including digitally responsive multiplying means and adding means, a digital source coupled to the multiplying means for supplying digital signals representative of the eccentricity of the ellipse, whereby said phase shifting means establishes the phase of said third sinusoidal wave under direction of said digital signals, and means coupling said third wave and one of said two waves respectively to the two axes of the graphical device for producing an elliptical waveform on said graphical device.

10. An ellipse generator as defined in claim 19 in which said generating means comprises a pair of integrating circuits coupled in a loop configuration.

11. An ellipse generator as defined in claim 9 in which said multiplying means comprises digital-to-analog converters with output waveforms each comprising a product of one of the sinusoidal waves and a trigonometric function of the intermediate phase angle defined by said digital signals.

12. A generator as defined in claim 9 which further includes a source of synchronizing pulses, and means programming said generating means to produce a single cycle in response to a synchronizing pulse.

13. A digitally controlled ellipse generator comprising in combination, means for generating two sinusoidal waves in quadrature phases, said generating means including a pair of integrating circuits coupled in a loop configuration a source of synchronizing pulses, means programming said generating means to produce a single cycle in response to a synchronizing pulse, the programming means including at least one two-state clamping circuit and means controlling said clamping circuit to establish the integrating circuits selectively in operating and quiescent states, digitally responsive phase shifting means for producing from said two sinusoidal waves a third sinusoidal wave with phase intermediate said quadrature phases, said phase shifting means including digitally responsive multiplying means and adding means, and a digital source coupled to the multiplying means for supplying digital signals representative of the eccentricity of the ellipse, whereby said phase shifting means establishes the phase of said third sinusoidal wave under direction of said digital signals.

14. A digitally controlled ellipse generator for producing a waveform on a two-axis graphical reproducing device comprising in combination, means for generating two sinusoidal waves in quadrature phases, digitally responsive phase shifting means for producing from said two sinusoidal waves a third sinusoidal wave with phase intermediate said quadrature phases, said phase shifting means including digitally responsive multiplying means and adding means, a digital source coupled to the multiplying means for supplying digital signals representative of the eccentricity of the ellipse, whereby said phase shifting means establishes the phase of said third sinusoidal wave under direction of said digital signals, and axis rotating means for producing from one of said two sinusoidal waves and said third sinusoidal wave two modified sinusoidal waves having the phases and amplitudes required to generate on said reproducing device an ellipse with its major axis inclined at a selected angle with respect to an axis of the reproducing device, said axis rotating means including multiplying means responsive to digital signals representative of the selected angle of the major axis of the ellipse and adding circuits.

15. An ellipse generator as defined in claim 14 wherein the latter multiplying means comprise digital-to-analog converters.

16. The ellipse generator defined in claim 15 including means programming the generating means to produce a single cycle in response to a synchronizing pulse.

17. An apparatus for generating an ellipse on a two axis graphical reproducing device, comprising in combination, means for generating output waves sin $(\omega t)$ and cos $(\omega t)$ of equal amplitude, digitally responsive means converting said output waves of the generating means into respective output signals $$x=R\sin(\omega t+\varphi)\cos\beta-R\sin(\omega t)\sin\beta$$
$$y=R\sin(\omega t)\cos\beta+R\sin(\omega t+\varphi)\sin\beta$$

where:

R=length of semi major axis of the ellipse $\beta$=angle of rotation of semi major axis of the ellipse with respect to $\pi/4$ $\varphi$=a phase shift angle which determines the eccentricity $e$ by the equation $$e=\frac{\sqrt{\cos^2\left(\frac{\varphi}{2}\right)-\sin^2\left(\frac{\varphi}{2}\right)}}{\cos(\varphi/2)}$$

in response to input digital signals identifying the phase shift, axis rotation and axis length parameters of the ellipse, and means coupling said output signals respectively to the two axes of the graphical device for producing an elliptical waveform on said graphical device.

18. Apparatus as defined in claim 17 in which the generating means comprises a pair of integrating circuits coupled in a loop configuration.

19. Apparatus as defined in claim 18 which further includes means for programming the generating means to produce a single cycle in response to a synchronizing pulse, said programming means including a two state clamping circuit for providing voltages which establish said integrating circuits selectively in operating and quiescent states.

20. Apparatus as defined in claim 17 in which said converting means includes a phase shift control circuit comprising a pair of first multiplying means producing a pair of signals in response to digital signals representative of sin $\varphi$ and cos $\varphi$ respectively of the phase shift angle $\varphi$, and an adder circuit processing said pair of signals to produce an ellipse signal $x'=\sin(\omega t+\varphi)$.

21. Apparatus as defined in claim 20 in which said converting means further includes a quadrant control circuit selectively providing a dual-polarity signal $y'=\pm\sin(\omega t)$ to respectively designate either the first and third or the second and fourth quadrants for generation of the major ellipse axis.

22. Apparatus as defined in claim 21 which further includes an axis rotation and axis length control circuit which includes four second multiplying means for generating the respective signals $Rx'\sin\beta$, $Ry'\sin\beta$, $Rx'\cos\beta$, and $Ry'\cos\beta$ in response to digital signals $R\sin\beta$ and $R\cos\beta$ supplied to said second multiplying means, an inverter producing a signal $-Ry'\sin\beta$ from the signal $Ry'\sin\beta$, and a pair of adder circuits combining the signals to produce said $x$ and $y$ output signals.

References Cited

UNITED STATES PATENTS

| | | | |
|---|---|---|---|
| 3,148,451 | 9/1964 | Morris et al. | 235—197 X |
| 3,205,349 | 9/1965 | Bryan et al. | 235—197 |

RODNEY D. BENNETT, Jr., Primary Examiner

T. H. TUBBESING, Assistant Examiner

U.S. Cl. X.R.

33—30; 235—150.5, 197; 340—324

PO-1050
(5/69)

UNITED STATES PATENT OFFICE
CERTIFICATE OF CORRECTION

Patent No. 3,476,974 Dated November 4, 1969

Inventor(s) Rodger Elmo Turnage, Jr., Jerald T. Stebbins and Lawrence R. Crump

It is certified that error appears in the above-identified patent and that said Letters Patent are hereby corrected as shown below:

Column 2, line 8, "$y = R \cos(\omega t + \alpha)$" should read "$x = R \cos(\omega t + \alpha)$".

Column 4, line 23, insert "an" before "r sin".

Column 4, line 53, "amplifier" should read "amplifiers".

Column 9, line 11, "19" should read "9".

SIGNED AND SEALED
MAY 5 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,476,974 Dated November 4, 1969

Inventor(s) Rodger Elmo Turnage, Jr., Jerald T. Stebbins, and Lawrence R. Crump

It is certified that error appears in the above-identified patent and that said Letters Patent are hereby corrected as shown below:

Column 3, line 37, "training" should read "trailing."

Column 6, line 45, "($\omega$/2)" should read "($\phi$/2)."

SIGNED AND
SEALED
JUL 14 1970

(SEAL)
Attest:

Edward M. Fletcher, Jr.
Attesting Officer

WILLIAM E. SCHUYLER, JR.
Commissioner of Patents